Figure 1:
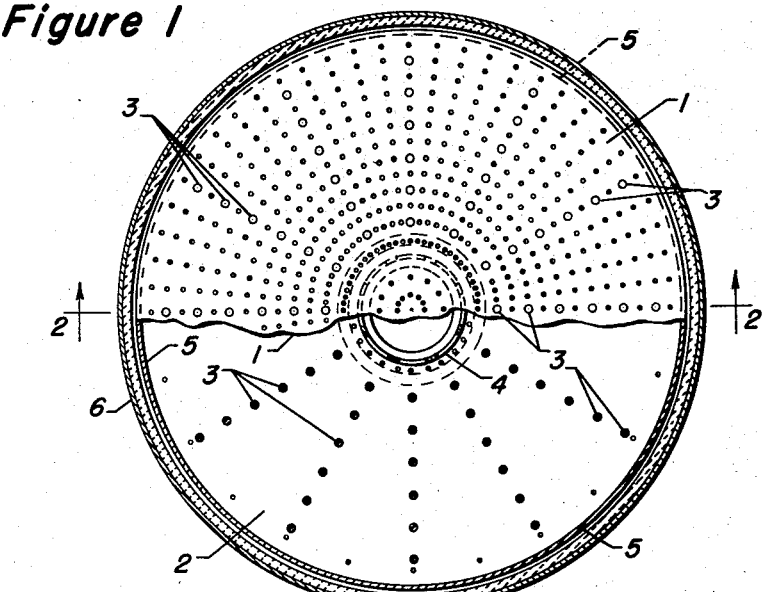

April 26, 1960 — F. V. PURSE — 2,934,411
DISTRIBUTING GRID
Filed Sept. 30, 1957

INVENTOR:
Frank V. Purse
BY:
Chester J. Giuliani
Glen R. Grunewald
ATTORNEYS.

United States Patent Office 2,934,411
Patented Apr. 26, 1960

2,934,411

DISTRIBUTING GRID

Frank V. Purse, Skokie, Ill., assignor, by mesne assignments, to Universal Oil Products Company, Des Plaines, Ill., a corporation of Delaware Application September 30, 1957, Serial No. 687,099

4 Claims. (Cl. 23—288)

This invention relates to distributing grid and particularly to a grid for distributing a vapor stream so that it effectively contacts a bed of fluidized particles.

In many industrial processes, it is desirable to contact solid particles with a fluid stream in a manner known as a fluidized bed of particles. The particles are contacted by passing the fluid upwardly through a bed thereof so that the bed of particles expands and the particles are out of continuous contact with each other and in a state of hindered settling. An expanded fluidized bed of particles resembles a boiling liquid, having a mobile but distinct upper surface and having pockets of gas emitting therefrom. Fluidized beds promote good contact, reduce channeling problems, cause effective utilization of all particles and cause extremely even distribution of heat and materials. An example of one use for a fluidized bed of particles is in the catalytic cracking of petroleum fractions wherein vapor phase petroleum is contacted with a fluidized bed of heterogeneous silica-alumina catalyst particles.

To obtain good utilization of the particles, it is necessary to distribute the fluid through the lower portion of the bed evenly so that no large bubbles of fluid pass through the bed and so that one portion of the bed offers as much resistance to flow as any other portion of the bed. It is also necessary to construct a distributor which has sufficient structural strength to support the entire bed of catalyst in unfluidized condition in case of shutdown or an upset which causes the fluidized bed to settle. In order to obtain sufficient structural strength, it has been customary to employ a distributing grid which is dome-shaped since flat grids tend to bend or buckle under the weight of the bed in unfluidized condition. The dome-shaped grid, however, is higher in the center than at the edges so that less head of fluidized bed is above the central portion of the grid which, therefore, causes less resistance to flow at that point. As a result, a greater portion of the fluid flows through the center of the bed than through the periphery and optimum utilization of particles is not obtained. A flat grid in many applications cannot be supported around its edge by the vessel walls since the metal to metal contact of the grid with the vessel wall would cause heat conduction through the grid to the wall so that a weakened hot spot on the vessel wall would be created by heat conduction through the grid. The hot grid and cold metal wall furthermore would cause strains due to differential expansion that would buckle either the grid or the vessel. For example, in a vessel wherein spent cracking catalyst is regenerated, it is necessary to insulate the entire interior of the regeneration vessel to prevent overheating of the metal walls thereof. The distributing grid within the vessel must, therefore, be "floating" so that it may expand and contract without straining the vessel wall and so that it does not conduct heat through the insulation to the vessel wall. These limitations make it very difficult to employ a flat plate as a grid since a flat plate requires support at its periphery in order to prevent buckling at the edges and it requires support in the center to prevent buckling at that point as well as at numerous intermediate points.

Even with a flat plate, fluid distribution is unsatisfactory unless there is a substantial pressure drop in the fluid stream as it passes through the grid. By maintaining a substantial pressure drop across the grid, all perforations in the grid will pass the same amount of fluid per unit of area. To obtain a pressure drop across the grid and still maintain a "floating" grid, it is an object of this invention to construct a grid assembly which comprises a sealed chamber into which gas is introduced and distributed through the perforations. Such a chamber in which a high pressure is maintained, however, tends to inflate so that a flat plate forming a large top closure of the chamber will tend to buckle outward. It is, therefore, important that a flat plate grid forming part of a distributing chamber be constructed to avoid buckling outwardly due to inflation as well as inwardly due to supporting weight.

A grid assembly is also more suitable for use when it occupies a small vertical height which, therefore, requires less elongated vessels with savings in construction cost. It must be easy to install and maintain and it must be relatively cheap to construct initially. It is an object of this invention to provide a fluid distributing grid which has a flat upper distributing plate, is resistant both to inflation and compression loads, occupies small vertical height, is cheap to install and is a "floating" grid which does not have contact with the vessel walls.

In one embodiment, this invention relates to a distributing grid comprising in combination a flat upper perforated distributing plate, a lower supporting-sealing member in the form of a truncated surface of revolution, a center pipe having a perforated upper end and a plurality of strut members, with the upper edge of said center pipe connected to the lower side of said flat plate, the peripheral edge of said supporting member connected to the peripheral edge of said flat plate in substantially vapor-tight manner, the lower edge of said supporting-sealing member connected to said center pipe below the perforated portion thereof in a substantially vapor-tight manner and said strut members connecting intermediate portions of said supporting-sealing member to intermediate portions of said flat plate member to impart rigidity to the latter.

The distributing assembly of this invention can best be described with reference to the accompanying drawings which show in Figure 1 a sectional plan view of a portion of a vessel containing one suitable grid of this invention, in Figure 2 the elevation view of Figure 1 and in Figures 3 and 4 partial sectional views of suitable grid assemblies.

Figure 2:
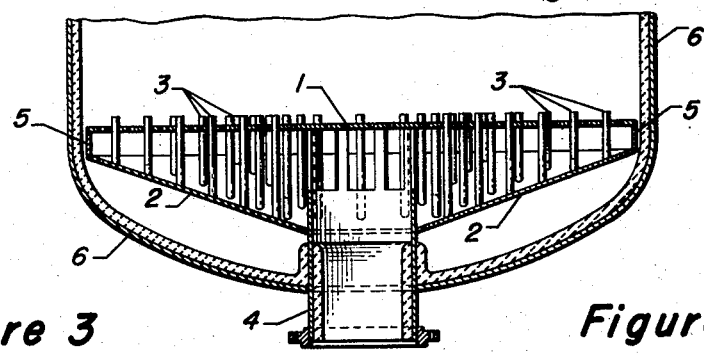

Referring to Figure 1, flat perforated plate 1 is illustrated within vessel 6 which may be an insulated pressure vessel. Center pipe 4 is connected to the underside of flat plate 1 and a series of strut members 3 are connected to flat plate member 1. Figure 2 illustrates more clearly the relationship of these components. Referring to Figure 2, it is observed that strut members 3 connect to supporting-sealing member 2 as well as to flat plate 1 and they act to transmit compression loads to supporting member 2 as well as inflation loads. Supporting member 2, in this figure, is a truncated conical member which is connected to the peripheral edge of flat plate 1 by means of a ring-shaped member 5 in vapor-tight relationship so that the combination of flat plate 1, ring member 5 and truncated conical member 2 forms a chamber through which gas may escape only through the perforations in flat plate member 1. Center pipe 4 connects to the welding neck of the vessel and to the inside of plate member 1 and contains perforations within the distributing chamber for passing gases beneath plate 1 for distribution in vessel 6. Conical member 2 is connected to centerpipe 4 beneath the perforations in a substantially fluid-tight relationship. In certain cases, it may be desirable to have a few perforations in conical member 2 for the purpose of sweeping material out from beneath the plate, however, this is not a necessary limitation and may be used only where convenient.

Conical member 2 is an extremely rigid structural form. This invention combines the conical member with the flat plate member in such a manner that the flat plate member forms the upper surface of the assembly and the conical member forms a portion of a chamber as well as providing structural strength to the assembly thereby resulting in a distributing grid having all of the desirable qualities hereinbefore described. The strut members 3 which transmit all loads directly from flat plate 1 to structural member 2 produce additional rigidity in plate member 1 so that it will not be buckled by a sudden upset or bulged by an inflation tendency. The truncated conical form of the supporting member produces a grid assembly having small vertical height since the narrow tapered portion may be disposed in the head of vessel 6. The surface of revolution forming member 2 preferably is either conical or concave upwardly since the best structural qualities can be obtained this way.

Figure 3:
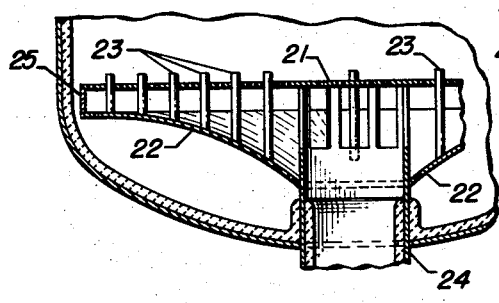

One variation of this invention having a concave upwardly structural member is shown in Figure 3 wherein flat plate 21 is supported by struts 23, center pipe 24, ring member 25, all of which transmit the load on flat plate 21 to supporting member 22. In this member, the portion carrying the load beneath the periphery of flat plate 21, where the load is the least, is substantially flatter than the portion of the supporting member supporting the load near the center of plate 21 where the load is substantially greater. The shape, therefore, is economical of vertical height since a steeply sloped portion is only employed near the center pipe rather than across the entire cross-section of the vessel.

Figure 4:
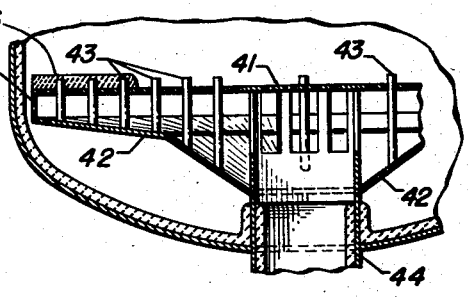

Figure 4 represents another variation of a concave upwardly supporting member wherein flat plate 41 is connected to a supporting member comprised of two truncated conical members, one having a steep slope and one having a small slope resulting in a member 42 which is connected to flat plate 41 by struts 43 thereby supporting the load with the same benefits as explained in relation to Figure. 3.

In one specific embodiment of this invention, which is illustrative rather than limiting on its broad scope, a distributing grid for use in the regenerator of a catalytic cracking plant requires that it distribute fluid in a vessel 12' in diameter and that the grid have a pressure drop across the flat upper plate of 4 p.s.i. For a vessel such as this, the top flat plate is constructed of alloy steel and is perforated with ½" diameter holes drilled on 7" centers. The supporting member consists of a truncated conical member constructed of 1" plate which is connected to the flat perforated plate by struts spaced 12" from each other in concentric circles which are 12" apart, said struts being constructed out of pipe 1½" in diameter. Employing the grid hereinabove described, the regeneration vessel will function so that each particle of fluidized material above the grid will receive substantially the same exposure to regeneration gas and the entire bed of fluidized particles will be at substantially uniform temperature whereby over-heating is avoided. Furthermore, the grid constructed in this manner "floats" in the bottom portion of the vessel having no physical connection to the vessel walls other than through the supporting conduit, will support the entire weight of the catalyst bed should fluidization be disrupted and will not bulge due to the internal pressure in the chamber formed between the conical load-supporting member and the flat plate member.

There may be many modifications of this invention to adapt it for particular use without removing it from the broad scope of this invention. In hot environments the grid assembly may be constructed of heat-resistant alloy and may have insulation such as layer 46 shown in Figure 4, disposed on the top of the flat plate to prevent differential expansion difficulties between it and the conical member. The strut members may have various cross sections and may be spaced and attached for ease of assembly or disassembly and other members may be suitably modified.

From the foregoing, it may be seen that the grid assembly of this invention provides an inexpensive fluid distributing apparatus which is designed and constructed to overcome most of the difficulties heretofore associated with distributing grids.

I claim as my invention:

1. A distributing grid assembly comprising in combination a flat upper perforated distributing plate, a lower supporting-sealing member in the form of a truncated surface of revolution, a center pipe having perforated sidewalls adjacent its upper end, the upper end of said center pipe connected to the lower side of said flat plate, the peripheral edge of said supporting member in vapor-tight connection with the peripheral edge of said flat plate, the lower edge of said supporting-sealing member in vapor-tight connection with said center pipe below the perforated portion thereof, a plurality of strut members positioned substantially vertical and connecting intermediate portions of said supporting-sealing member to intermediate portions of said flat plate member to impart rigidity to the latter.

2. The apparatus of claim 1 further characterized in that said supporting-sealing member is in the form of a truncated cone.

3. The apparatus of claim 1 further characterized in that said supporting-sealing member is in the form of an upwardly concave truncated surface of revolution.

4. The apparatus of claim 1 further characterized in that said flat upper perforated distributing plate has an insulating cover over the top surface thereof with perforations therethrough to match perforations of said flat plate.

References Cited in the file of this patent

UNITED STATES PATENTS

| | | |
|---|---|---|
| 2,468,508 | Munday | Apr. 26, 1949 |
| 2,595,909 | Trainer | May 6, 1952 |
| 2,628,932 | Ringgenberg | Feb. 17, 1953 |
| 2,714,126 | Keith | July 26, 1955 |
| 2,798,030 | Hettick | July 2, 1957 |
| 2,836,902 | North | June 3, 1958 |